Feb. 27, 1962 J. KURSHAN 3,023,153

METHOD OF ETCHING SEMI-CONDUCTOR BODIES

Original Filed June 1, 1954

INVENTOR.
JEROME KURSHAN
BY J. L. Whittaker
ATTORNEY

United States Patent Office 3,023,153
Patented Feb. 27, 1962

3,023,153
METHOD OF ETCHING SEMI-CONDUCTOR BODIES

Jerome Kurshan, Princeton, N.J., assignor to Radio Corporation of America, a corporation of Delaware
Original application June 1, 1954, Ser. No. 434,945. Divided and this application Apr. 13, 1959, Ser. No. 806,187
2 Claims. (Cl. 204—143)

This application is a division of application Serial No. 434,945, filed June 1, 1954, now abandoned.

This invention relates to etching of semi-conductive materials suitable for making semi-conductor devices. More particularly, the invention relates to electrical control of electrolytic and chemical etching of semi-conductive materials to produce thin membranes of these materials having a predetermined thickness.

Chemical and electrolytic etching of semi-conductive materials such as germanium and silicon is described for example in an article by Tiley and Williams in The Proceedings of the I.R.E., volume 41, page 1706, December 15, 1953. Previous to the present invention, however, there has been no convenient method for accurately determining the thickness of a membrane being etched during the process. Previous etching processes depend on relatively critical timing of the etching to control the thickness of an etched membrane. For example, in the process described in the article heretofore referred to, two etching steps are requisite. First, a hole is etched completely through a semi-conductive wafer and the time required to perforate the wafer is carefully measured. Second, another portion of the wafer is then etched for a slightly shorter period of time to produce a thin membrane. Such a method is obviously relatively cumbersome and further, does not take into account variations in the thickness of the wafer from one point to another.

One object of the instant invention is to provide improved methods of etching semi-conductive materials.

Another object of the invention is to provide improved semi-conductor bodies having relatively thin membranes of controlled thickness and suitable for making semi-conductor devices.

Another object is to provide improved methods of controlling etching of semi-conductor bodies to produce thin membranes in said bodies.

Another object is to provide improved electrolytic etching methods for etching semi-conductive materials.

Another object is to provide improved methods of controlling electrolytic etching of semi-conductor bodies to provide an electrical signal to indicate the progress of the etching.

Another object is to provide an improved method of controlling the chemical etching of semi-conductor bodies to limit the penetration of said etching into said bodies.

Yet another object is to provide improved methods of etching semi-conductor bodies to provide thin membranes of a predetermined thickness in said bodies and to electroplate material upon said membranes.

These and other objects and advantages are accomplished by the instant invention which utilizes the barrier layer effect to measure and to control the depth of penetration of a chemical or electrolytic etch into a semi-conductor body. Briefly, according to one embodiment of the invention an electrolyte is contacted to one surface of a p-type semi-conductor wafer and a rectifying electrode such as a point probe is contacted to the opposite surface to establish a rectifying barrier thereat. A potential is applied between the electrolyte and the electrode to make the electrolyte electrically negative with respect to the electrode. This potential simultaneously biases the barrier in the reverse direction and induces an etching current to etch the wafer. A large increase in current occurs when the wafer is reduced by etching to a thickness wherein the electrolyte contacts the Schottky layer associated with the biased barrier. This increase in current is utilized to indicate the progress of the etching. Further, the current distribution within the wafer is controlled by the rectifying electrode and the Schottky layer thereby to cause the electrolyte preferentially to etch a limited region of the wafer surface to produce a pit or well in the surface.

The terms "Schottky barrier" and "Schottky layer" as used in this specification refer to a region in a semi-conductor body adjacent to a rectifying junction across which region the major part of an applied back direction voltage appears. The Schottky barrier thickness varies in direct proportion to the applied voltage whereas the junction itself may be regarded as a surface having no thickness.

Alternative embodiments include controlled etching upon n-type as well as p-type semi-conductors, the control of etching by forward biasing a barrier opposite the surface being etched, and also the control of electrolytic etching by means of a surface barrier contacted by the etching electrolyte itself.

The invention will be explained in greater detail in connection with the accompanying drawing of which:

Similar reference characters are applied to similar elements throughout the drawing.

*Electrolytic Etching of P-type Conductivity Material*

Figure 1:
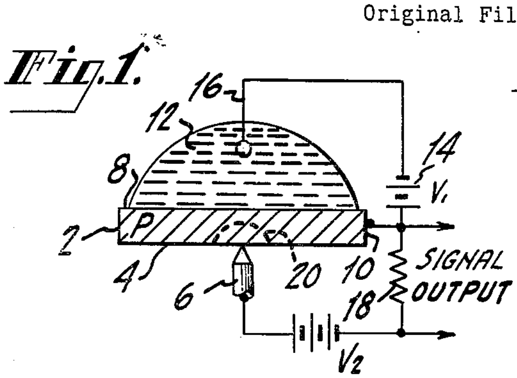
FIGURE 1 is a schematic, cross-sectional, elevational view of a semi-conductor body being etched according to one embodiment of the invention.
Figure 2:
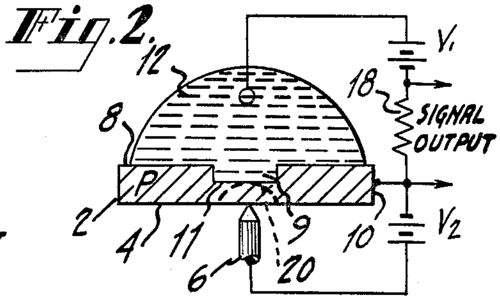
FIGURE 2 is a schematic, cross-sectional, elevational view of a semi-conductor body being etched according to a second embodiment of the invention.

According to one embodiment of the instant invention a wafer of p-type semi-conductive material is controllably etched to reduce a portion of the wafer to a thin membrane as illustrated in FIGURES 1 and 2. FIGURE 1 shows an arrangement for providing an electrical signal when the etching of a p-type semi-conductive body has proceeded to a point where the body or a section of the body is reduced to a predetermined thickness.

A wafer 2 of p-type semi-conductive germanium of any desired size is cut from an ingot. The wafer may conveniently be about .085" x 0.1" x .01" thick. It is initially prepared by etching it in a hydrofluoric acid-nitric acid solution to reduce its thickness to about .006". A rectifying contact is made on one surface 4 of the wafer as by a point probe 6. A non-rectifying connection 10 is made at another point on the surface of the wafer. The surface 8 of the wafer opposite the rectifying contact is exposed to an electrolyte 12 such as a 2% sodium hydroxide solution. The electrolyte may be placed in the form of a drop upon the surface of the wafer or, alternatively, portions of the wafer may be protected by a masking lacquer and the entire wafer immersed in a relatively large quantity of the electrolyte. An electrolyzing potential $V_1$ of about 2 to 5 volts is applied between the wafer and the electrolyte in an etching direction as by connecting a battery 14 between the non-rectifying contact 10 and an electrode 16 in contact with the electrolyte. A biasing potential of a predetermined value such as about 20 to 75 volts is applied through a limiting and sampling resistor 18 between the rectifying contact and the wafer. The value of the biasing potential determines the resulting thickness of the etched wafer at which a signal is produced across the resistor.

In operation, the biasing potential biases the rectifying contact in the reverse direction, thereby to increase the thickness of the Schottky barrier to an extent determined by the potential and the resistivity of the semi-conductive material. For example, in utilizing germanium of about 3 ohm-centimeter resistivity and a reverse bias potential of about 75 volts, the edge of the Schottky layer as indicated by the dotted line 20 is extended about 15$\mu$ into the wafer. When the thickness of the semi-conductor has been reduced by etching to correspond with the thickness of the Schottky layer, the edge of the Schottky layer is brought into contact with the electrolyte, and the current through the barrier and the sampling resistor increases suddenly and rapidly. This relatively large increase in current through the resistor is utilized to provide a signal to indicate that the penetration of the etching has reduced the wafer thickness to a particular value. The signal may readily be utilized to actuate automatic equipment to limit the etching.

The increase in current occurs because when the edge of the Schottky layer contacts the electrolyte the current in the wafer is limited principally by space charge instead of diffusion effects. As long as the wafer remains subtsantially thicker than the Schottky barrier the current through the wafer is limited by the rate of diffusion of charge carriers between the barrier and the surface being etched. The reverse bias potential initially appears across the barrier only and does not extent across the full thickness of the wafer or into the electrolyte. When the wafer thickness is reduced to the thickness of the Schottky barrier, however, diffusion of charge carriers ceases to play a limiting part in the current flow, and the biasing potential appears across the entire thickness of the wafer. At this point the current through the barrier is limited primarily by the space charge effects in the material and the other parameters of the circuit.

The voltage at which the Schottky barrier is extended to include the entire thickness of the base wafer will be referred to herein as the punch-through voltage. Likewise, the point in the electroetching process when the etching reduces the thickness of the wafer to correspond to the thickness of the Schottky layer will be referred to as the punch-through point.

Another embodiment of the invention is shown in FIGURE 2 and relates to preferential etching at the base of a pit or well in a wafer 2 of p-type semi-conductive germanium. In this case the process begins with the wafer in which a pit or well 9 has been drilled or etched to form a relatively thin membrane 11 in a portion of the wafer. The membrane is sufficiently thin, about .001" to .002", so that a rectifying barrier 20 at one surface of the membrane may be biased to its punch-through voltage by a potential smaller than its breakdown potential. The physical arrangement of the etching apparatus is similar to the arrangement shown in FIGURE 1. A rectifying contact such as a point probe 6 or an electroplated metallic film is placed on one surface 4 of the wafer opposite to and aligned with the pit or well. A drop of electrolyte 12 is placed on the surface 8 of the wafer bearing the pit. A neutralizing potential, $V_1$, of about 1 to 5 volts is applied through a sampling resistor 18 between a non-rectifying contact 10 to the wafer and the electrolyte. The neutralizing potential is in the direction opposing etching of the wafer. A biasing potential, $V_2$, greater than the punch-through voltage is applied between the non-rectifying contact and the barrier. The biasing potential, being relatively large compared to the neutralizing potential, acts as the electro-etching force so that etching takes place preferentially at the base of the pit rather than upon the other surfaces of the wafer exposed to the electrolyte. The neutralizing potential, $V_1$, may be varied according to the amount of etching desired upon these other surfaces of the wafer. Increasing the neutralizing potential restricts the area of the wafer being etched. Reducing the potential increases the etched area. If the neutralizing potential is reduced to zero some etching takes place upon all surfaces of the wafer in contact with the electrolyte, but the surface contacted by the Schottky layer at the base of the pit is still preferentially etched because of the potential gradient created along the surface by the Schottky layer.

Etching in this manner preferentially at the base of a pit may be utilized to prepare the surface at the base of the pit for subsequent processing such as, for example, alloying a rectifying electrode. Previous methods of chemical and electrolytic etching are relatively ineffective to etch recessed regions on a surface because of both the well known ion-depletion and electric current distribution effects common in electrolytic processes.

The electroetching may be periodically interrupted in order to vary the biasing potential to obtain a measure of the thickness of the membrane as the etching progresess. As the biasing potential is increased from a very low value a relatively large increase in current through the sampling resistor and the barrier occurs at the punch-through voltage. This relatively large and sudden current increase may be utilized to provide a voltage signal across the sampling resistor in the same manner as heretofore described in connection with the embodiment illustrated in FIGURE 1.

*Electrolytic Etching of N-Type Conductivity Material*

Figure 3:
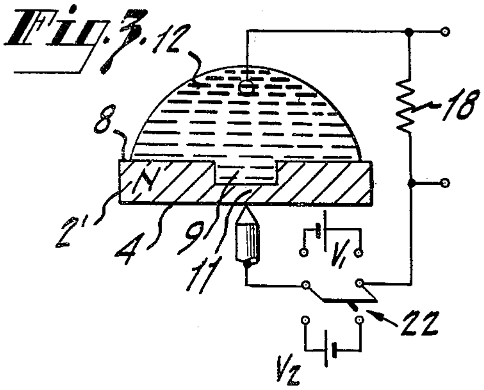
FIGURE 3 is a schematic, cross-sectional, elevational view of a semi-conductor body being etched according to a third embodiment of the invention.

A third embodiment of the invention is illustrated in FIGURE 3 and relates to controlled electrolytic etching inside a well or cavity in a wafer of n-type semi-conductive material. According to this embodiment of the invention a wafer 2' of n-type semi-conductive material is electrolytically etched to provide a thin membrane 11 in a portion thereof. A pit or well is preferably drilled or otherwise formed in one surface 8 of the wafer and a rectifying contact is made to the opposite surface 4 of the wafer in alignment with the pit. An electrolyte 12 is contacted to the surface 8 of the wafer bearing the pit. An electrolyzing potential $V_2$ is applied in the etching direction through a sampling resistor 18 between the rectifying contact and the electrolyte. This potential biases the barrier at the rectifying contact in the forward direction and induces etching preferentially at the base of the pit.

A switch 22 is provided in the circuit to disconnect the electrolyzing potential $V_2$ and to substitute in its place a reverse biasing potential $V_1$. The reverse biasing potential is selected to be of sufficient magnitude to extend the Schottky layer to the thickness to which it is desired to reduce the membrane. At the beginning of the process only a relatively small current is induced by the reverse biasing potential because the rectifying barrier limits the current. As the etching progresses, however, the thickness of the membrane is reduced to the punch-through point. At the punch-through point the reverse biasing potential induces a relatively large current through the barrier and through the rest of the circuit including the sampling resistor. Thus, with n-type semi-conductive material etching may be carried out preferentially at the base of a pit in the material and periodically interrupted to determine the thickness of the membrane at the base of the pit. When the membrane is reduced to the punch-through point a relatively large voltage signal is provided across the sampling resistor.

Figure 4:
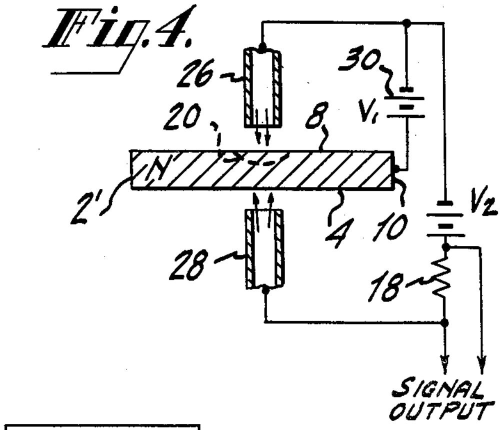
FIGURE 4 is a schematic, cross-sectional, elevational view of a semi-conductor body being etched according to a fourth embodiment of the invention; and, FIGURE 5 is a schematic, cross-sectional, elevational view of a semi-conductor body being etched according to a fifth embodiment of the invention.

Controlled etching of n-type semi-conductor bodies is also provided by the instant invention without any metallic contact to the body in the vicinity of the etched region. FIGURE 4 illustrates etching according to the invention of an n-type semi-conductor body 2' utilizing a pair of opposed electrolyte jets 26 and 28 directed upon opposite surfaces of the body. The electrical circuit to control the electrolytic etching includes an electrolyzing potential $V_1$ applied in the etching direction between one jet 26 and the semi-conductor body. A second potential $V_2$ approximately equal to the electrolyzing potential is applied through a sampling resistor 18 between the two jets. This second potential counteracts the effect of the electrolyzing potential upon the second jet 28 to maintain the second jet at approximately the same potential as the body being etched. Both potentials may be about 25 to 75 volts depending upon the thickness to which it is desired to etch the wafer. Rectifying barriers due to surface energy level effects are disposed at the surfaces of the wafer contacted by the jets, and the electrolyzing potential serves to bias the barrier contacted by the first jet 26 in the reverse direction and to extend the Schottky layer 20 of this barrier into the wafer toward the opposing jet 28. When the etching reduces the wafer thickness to the punch-through point for this Schottky layer the second potential $V_2$ induces a relatively large current through the wafer, the electrolyte jets and the sampling resistor. This large increase in current may be utilized as heretofore described to provide a signal to indicate the reduction of thickness of the wafer.

The only rigid connection to the wafer required for the process is the ohmic connection 10 which may be formed by soldering a fine wire to the wafer. This embodiment of the invention is particularly advantageous for etching relatively thin and fragile wafers.

It should be noted that this embodiment of the invention relies upon the effect of the surface barrier at the surface being etched instead of upon the effect of a barrier at the opposite surface of the wafer. This effect may also be utilized as described in the co-pending application of Jerome Kurshan, Serial No. 433,618 now Patent No. 2,940,024, filed concurrently herewith, to control etching of n-type semi-conductor wafers without the use of electrolyte jets. For example, a drop of the etching electrolyte may be placed on one surface 8 of the wafer and an electrode contacted to the opposite surface 4 of the wafer by either a rectifying or non-rectifying connection. Etching may then be controlled by the surface barrier at the surface contacted by the electrolyte to reduce the thickness of the wafer to a predetermined value.

In other embodiments of the invention the potential applied across the surface being etched is relatively small compared to the biasing potential and does not extend the Schottky barrier far enough into the wafer from the etched surface significantly to affect the process.

*Electrical Control of Chemical Etching*

The practice of the invention is also applicable to the control of chemical etching of semi-conductor wafers as well as to the control of electrolytic etching. In accordance with the present invention it has been found that an electrical potential applied in the plating direction between a chemically etching electrolyte and a semi-conductor body inhibits the action of the electrolyte. The control process according to the invention is particularly applicable to controlling chemical etching of n-type semi-conductive materials as shown in FIGURE 5.

Figure 5:
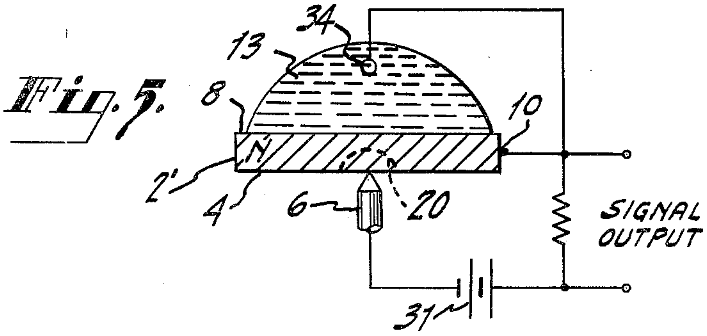

FIGURE 5 shows an n-type semi-conductor body 2' being etched by a drop of a hydrofluoric acid—nitric acid—copper nitrate etchant placed on one surface 8 of the body. A biasing potential 31 is applied between a rectifying contact 6 upon an opposite surface 4 of the wafer, and a non-rectifying contact 10 to the wafer. A control electrode 34 is placed in contact with the electrolyte and electrically connected to the non-rectifying contact to the wafer. The biasing potential biases the rectifying contact in the reverse direction and extends the edge of the Schottky layer 20 associated with the contact into the wafer toward the electrolyte. The etchant etches into the wafer at its normal rate until it reaches the edge of the Schottky layer. At this point it encounters the biasing potential which inhibits the rate of etching into the Schottky layer. Further, because of the punch-through effect the biasing potential induces a relatively large increase in current through the barrier, the electrolyte and the sampling resistor when the etchant contacts the Schottky layer. The increase in current provides a voltage signal across the sampling resistor which may be utilized as heretofore described to control the process.

When the etching penetrates to the punch-through point the biasing potential not only inhibits the etching rate but also electroplates metallic ions from the etchant upon the semi-conductor surface. This effect depends, of course, upon the presence of platable ions in the etchant. If it is desired not to form an electroplated film upon the punch-through surface, the etchant should be relatively free of metal ions. On the other hand, a solution relatively rich in metal such as copper and nickel may be utilized to form an electroplated contact surface layer over that portion of the semi-conductor body contiguous with the edge of the Schottky layer exposed by etching.

The practice of the invention is not limited to etching of semi-conductive germanium and silicon as heretofore described but is also applicable to etching of all known semi-conductor materials that may be prepared in single crystal form. For example, electrically controlled etching may be conducted on semi-conductive aluminum antimonide, indium phosphide and alloys of germanium and silicon. Other electrolytes than those specifically described may also be utilized. An important feature of the invention is the electrical control of etching of semi-conductor materials utilizing the barrier layer effect. These effects are substantially independent of the selection of an electrolyte. For example, in place of dilute sodium hydroxide solutions, dilute hydrochloric acid solutions may be substituted.

There have thus been described improved methods of controlling the etching of semi-conductor bodies of both n-type and p-type conductivity.

What is claimed is:

1. A method of controllably etching a preselected portion of one surface of an n-type semi-conductor body having a surface barrier comprising contacting a first electrolyte to said one surface, contacting a second elctrolyte to another surface of said body opposite said one surface, applying an etching potential between said first electrolyte and said body thereby to induce an etching current through said one surface and to bias the surface barrier at said one surface in its reverse direction, applying a balancing potential approximately equal to said etching potential between said first and second electrolytes thereby to maintain said second electrolyte at a potential about equal to the potential of said body, and continuing said etching until a sudden increase in current occurs through the wafer and the electrolyte.

2. The method according to claim 1 in which said electrolytes are formed into jets and projected upon said surfaces.

References Cited in the file of this patent

UNITED STATES PATENTS

| | | |
|---|---|---|
| 2,846,346 | Bradley | Aug. 5, 1958 |
| 2,875,140 | Sikina | Feb. 24, 1959 |